United States Patent
Kazar et al.

(10) Patent No.: US 7,466,659 B1
(45) Date of Patent: Dec. 16, 2008

(54) SYSTEM AND METHOD FOR PERFORMING VERSION NEGOTIATION OF A NETWORK PROTOCOL AND ASSOCIATED INTERFACES

(75) Inventors: Michael Kazar, Pittsburgh, PA (US); Peter F. Corbett, Lexington, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 624 days.

(21) Appl. No.: 11/119,119

(22) Filed: Apr. 29, 2005

(51) Int. Cl.
*H04J 1/16* (2006.01)
*H04L 12/56* (2006.01)

(52) U.S. Cl. .................. 370/252; 370/278; 370/466

(58) Field of Classification Search ........... 370/252, 370/466, 467, 389, 352, 400, 401, 282, 419, 370/278; 709/224, 238–244, 230
See application file for complete search history.

(56) References Cited

U.S. PATENT DOCUMENTS

| 6,202,096 B1* | 3/2001 | Williams et al. ............ 709/230 |
| 6,721,286 B1* | 4/2004 | Williams et al. ............ 370/282 |
| 2004/0243703 A1* | 12/2004 | Demmer et al. ............ 709/224 |
| 2005/0128956 A1* | 6/2005 | Hsu et al. ................... 370/252 |

FOREIGN PATENT DOCUMENTS

| JP | 10003440 A | 6/1998 |
| WO | WO 00/07101 A1 | 2/2000 |

* cited by examiner

*Primary Examiner*—John Pezzlo
(74) *Attorney, Agent, or Firm*—Cesari and McKenna, LLP

(57) ABSTRACT

A system and method efficiently performs version negotiation of a network protocol executing on storage systems or nodes of a cluster. A session layer of a network protocol executing on the nodes manages the creation and termination of sessions between a pair of nodes in the cluster. Notably, session version negotiation occurs during session creation and, as such, is accomplished using a single request/response "create session" exchange. Session version negotiation is effected using contents of protocol tag and version fields of headers associated with the request and response messages exchanged between the nodes. The version field contains a proposed version of the protocol for use by the nodes in the session. The protocol tag field contains values or tags that define the context in which the request and response messages are used during the create session exchange. Interface version negotiation is performed after session version negotiation. The session layer version negotiation includes negotiation of the version of a small set of operations. One of these operations can be used to subsequently negotiate the versions of many additional sets of operations, even though these operations co-exist at the same level of encapsulation in the protocol.

27 Claims, 9 Drawing Sheets

SYSTEM AND METHOD FOR PERFORMING VERSION NEGOTIATION OF A NETWORK PROTOCOL AND ASSOCIATED INTERFACES

CROSS-REFERENCE TO RELATED APPLICATION

The present application is related to U.S. patent application Ser. No. 11/118,466 entitled, SYSTEM AND METHOD FOR MULTIPLEXING CHANNELS OVER MULTIPLE CONNECTIONS IN A STORAGE SYSTEM CLUSTER, which application is hereby incorporated by reference.

FIELD OF THE INVENTION

The present invention is directed to network protocols and, in particular, to negotiation of a version of a network protocol and one or more interfaces associated with the network protocol.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access data containers, such as files and logical units, stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system cluster configured to service many clients. Each storage system or node may be configured to service one or more volumes, wherein each volume stores one or more data containers. Communication among the nodes involves the exchange of information between two or more entities interconnected by communication links. These entities are typically software programs executing on the nodes. The nodes communicate by exchanging discrete packets or messages of information according to predefined protocols. In this context, a protocol consists of a set of rules defining how the nodes interact with each other.

Each node generally provides its services through the execution of software modules, such as processes. A process is a software program that is defined by a memory address space. For example, an operating system of the node may be implemented as a single process with a large memory address space, wherein pieces of code within the process provide operating system services, such as process management. Yet, the node's services may also be implemented as separately-scheduled processes in distinct, protected address spaces. These separate processes, each with its own process address space, execute on the node to manage resources internal to the node and, in the case of a database or network protocol, to interact with a variety of network elements.

Services that are part of the same process address space communicate by accessing the same memory space. That is, information exchanged between services implemented in the same process address space is not transferred, but rather may be accessed in a common memory. However, communication among services that are implemented as separate processes is typically effected by the exchange of messages. For example, information exchanged between different addresses spaces of processes is transferred as one or messages between different memory spaces of the processes. A known message-passing mechanism provided by an operating system to transfer information between process address spaces is the Inter Process Communication (IPC) mechanism.

Resources internal to the node may include communication resources that enable a process on one node to communicate over the communication links or network with another process on a different node. The communication resources include the allocation of memory and data structures, such as messages, as well as a network protocol stack. The network protocol stack, in turn, comprises layers of software, such as a session layer, a transport layer and a network layer. The Internet protocol (IP) is a network layer protocol that provides network addressing between nodes, whereas the transport layer provides a port service that identifies each process executing on the nodes and creates a connection between those processes that indicate a willingness to communicate. Examples of conventional transport layer protocols include the reliable connection (RC) protocol and the Transmission Control Protocol (TCP).

Broadly stated, the connection provided by the transport layer, such as that provided by TCP, is a reliable, securable logical circuit between pairs of processes. A TCP process executing on each node establishes the TCP connection in accordance with a conventional "3-way handshake" arrangement involving the exchange of TCP message or segment data structures. The resulting TCP connection is identified by port numbers and IP addresses of the nodes. The TCP transport service provides reliable delivery of a message using a TCP transport header. The TCP protocol and establishment of a TCP connection are described in *Computer Networks, 3rd Edition*, particularly at pgs. 521-542, which is hereby incorporated by reference as though fully set forth herein.

Flow control is a protocol function that controls the flow of data between network protocol stack layers in communicating nodes. At the transport layer, for example, flow control restricts the flow of data (e.g., bytes) over a connection between the nodes. The transport layer may employ a fixed sliding-window mechanism that specifies the number of bytes that can be exchanged over the network (communication link) before acknowledgement is required. Typically, the mechanism includes a fixed sized window or buffer that stores the data bytes and that is advanced by the acknowledgements.

The session layer manages the establishment or binding of an association between two communicating processes in the nodes. In this context, the association is a session comprising a series of interactions between the two communicating processes for a period of time, e.g., during the span of a connection. Upon establishment of the connection, the processes take turn exchanging information, such as commands and data, over the session, typically through the use of request and response messages in accordance with a network protocol.

To ensure accurate and consistent exchange of information among the processes, each node should execute a common version of the network protocol software. In a cluster environment, however, the possibility exists that one node may undergo a software version upgrade before the other node, thereby resulting in different versions of the network protocol executing on the nodes. This situation is especially likely to arise if the nodes are geographically dispersed throughout the cluster. It is thus desirable to provide a technique that ensures that the nodes execute a common version of a network protocol in a cluster.

SUMMARY OF THE INVENTION

The present invention overcomes the disadvantages of the prior art by providing a system and method for efficiently performing version negotiation of a network protocol executing on storage systems or nodes of a cluster. Each node is generally organized as a network element and a disk element. Each element includes a cluster fabric interface module adapted to implement the network protocol, which integrates a session infrastructure and an application operation set into a session layer. The session layer manages the creation and termination of sessions between a pair of elements in the cluster. Each session provides a context for the flow of request messages and the flow of corresponding response messages to those requests through the network.

According to the invention, session version negotiation occurs during session creation and, as such, is accomplished using a single request/response "create session" exchange. Notably, session version negotiation is effected using contents of protocol tag and version fields of headers associated with the request and response messages exchanged between the elements (nodes). The version field contains a proposed version of the protocol for use by the nodes in the session. The protocol tag field contains values or tags that define the context in which the request and response messages are used during the create session exchange. For example, INIT and INIT_RESP values are used for request and response messages during session creation, while REQ and RESP values are used for request and response messages, respectively, after session establishment.

Broadly stated, the nodes send proposed version numbers, tagged with INIT or INIT_RESP values, in the headers of their respective messages during the create session exchange. Once a node identifies a proposed version of the protocol that it can use ("speak"), the node starts sending messages having headers tagged with REQ or RESP values and without version numbers. Version number negotiation starts high, e.g., with the highest version number that the session initiator speaks, and proceeds downwards to thereby guarantee that the negotiation results in the selection of the highest mutually-spoken version. Once a protocol version is selected for a session, all further messages in that session use the same protocol version.

The invention further allows the negotiation of versions of a large number of separate sets of operations, called "interfaces." Each interface version can be separately negotiated once the overall session version has been negotiated. The interfaces can be versioned independently, even though the request and response message structure contains information that is dependent on either the session version negotiated or the specific interface version negotiated. Negotiating the session version enables a small set of session operations called the session interface. One of these operations may later be used to negotiate the version of all additional interfaces to be used in the session.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
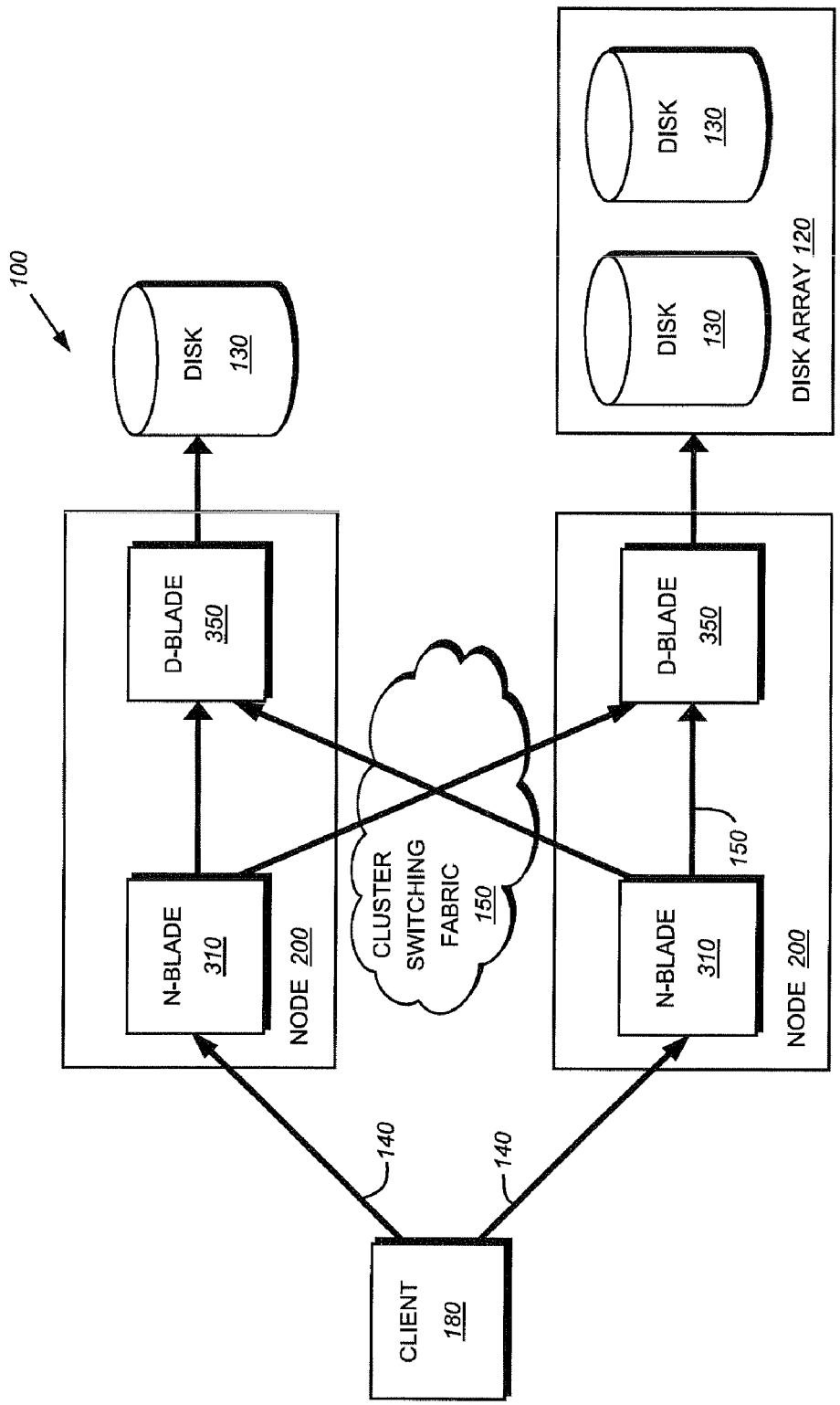
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-blade 310) and a disk element (D-blade 350). The N-blade 310 includes functionality that enables the node 200 to connect to clients 180 over a computer network 140, while each D-blade 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-blades in the illustrative cluster 100, there may be differing numbers of N and/or D-blades in accordance with various embodiments of the present invention. For example, there may be a plurality of N-blades and/or D-blades interconnected in a cluster configuration 100 that does not reflect a one-to-one correspondence between the N and D-blades. As such, the description of a node 200 comprising one N-blade and one D-blade should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
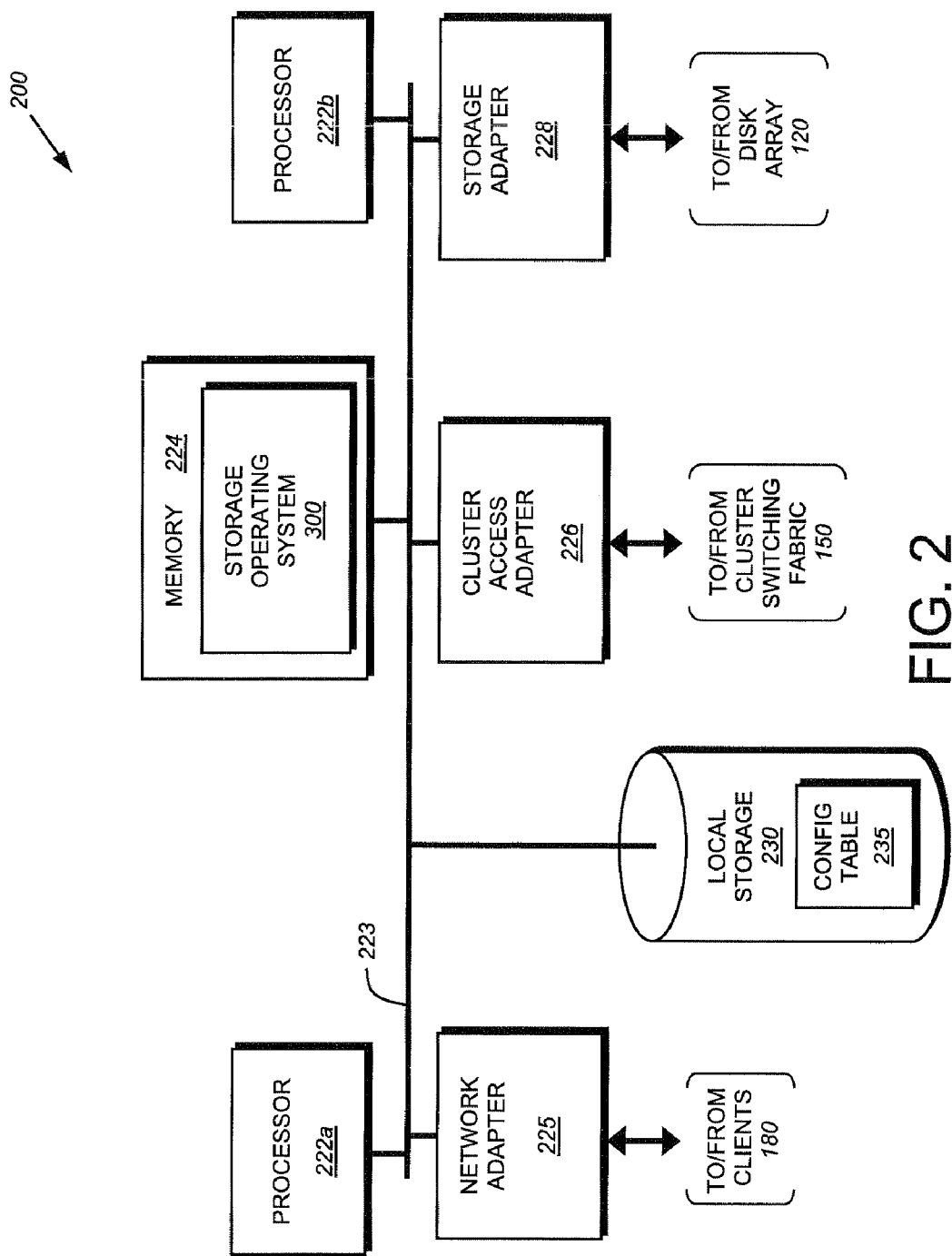
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-blades and D-blades are implemented on separate storage systems or computers, the cluster access adapter 226 is utilized by the N/D-blade for communicating with other N/D-blades in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-blade 310 on the node, while the other processor 222b executes the functions of the D-blade 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
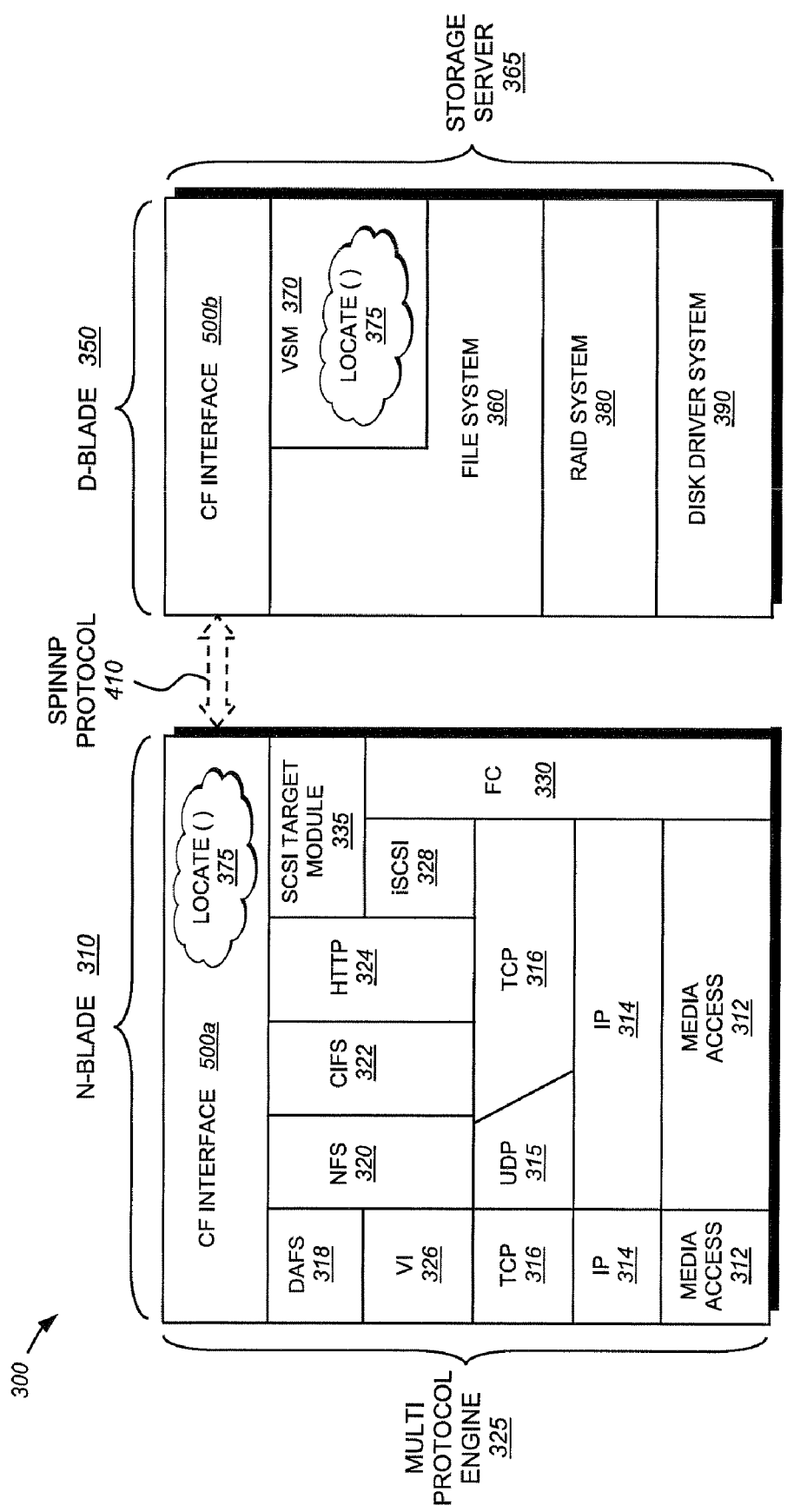
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) and cooperates with the file system 360 to enable storage server 365 to service a volume of the SVS. In particular, the VSM 370 implements a Locate( ) function 375 to compute the location of data container content in the SVS volume thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. SpinNP Network Protocol

In the illustrative embodiment, the storage server 365 is embodied as D-blade 350 of the storage operating system 300 to service one or more volumes of array 120. In addition, the multi-protocol engine 325 is embodied as N-blade 310 to (i) perform protocol termination with respect to a client issuing incoming data access request packets over the network 140, as well as (ii) redirect those data access requests to any storage server 365 of the cluster 100. Moreover, the N-blade 310 and D-blade 350 cooperate to provide a highly-scalable, distributed storage system architecture of the cluster 100. To that end, each blade includes a cluster fabric (CF) interface module 500a,b adapted to implement a network protocol that enables intra-cluster communication among the blades, as described herein.

The protocol layers, e.g., the NFS/CIFS layers and the iSCSI/FC layers, of the N-blade 310 function as protocol servers that translate file-based and block based data access requests from clients into network protocol messages used for communication with the D-blade 350. That is, the N-blade servers convert the incoming data access requests into primitive operations (commands) that are embedded within messages by the CF interface module 500 for transmission to the D-blades 350 of the cluster 100. Notably, the CF interface modules 500 cooperate to provide a single file system image across all D-blades 350 in the cluster 100. Thus, any network port of an N-blade that receives a client request can access any data container within the single file system image located on any D-blade 350 of the cluster.

Further to the illustrative embodiment, the N-blade 310 and D-blade 350 are implemented as separately-scheduled processes of storage operating system 300; however, in an alternate embodiment, the blades may be implemented as pieces of code within a single operating system process. Communication between an N-blade and D-blade is thus illustratively effected through the use of message passing between the blades although, in the case of remote communication between an N-blade and D-blade of different nodes, such message passing occurs over the cluster switching fabric 150. A known message-passing mechanism provided by the storage operating system to transfer information between blades (processes) is the Inter Process Communication (IPC) mechanism.

The network protocol illustratively described herein is the Spin network protocol (SpinNP) that comprises a collection of methods/functions constituting a SpinNP application programming interface (API). SpinNP is a proprietary protocol of Network Appliance of Sunnyvale, Calif. The term SpinNP is used herein without derogation of any trademark rights of Network Appliance, Inc. The SpinNP API, in this context, is a set of software calls and routines that are made available (exported) by a process and that can be referenced by other processes. As described herein, all SpinNP protocol communication in the cluster occurs via connections. Communication is illustratively effected by the D-blade exposing the SpinNP API to which an N-blade (or another D-blade) issues calls. To that end, the CF interface module 500 is organized as a CF encoder and CF decoder. The CF encoder of, e.g., CF interface 500a on N-blade 310 encapsulates a SpinNP message as (i) a local procedure call (LPC) when communicating a command to a D-blade 350 residing on the same node 200 or (ii) a remote procedure call (RPC) when communicating the command to a D-blade residing on a remote node of the cluster 100. In either case, the CF decoder of CF interface 500b on D-blade 350 de-encapsulates the SpinNP message and processes the command.

Figure 4:
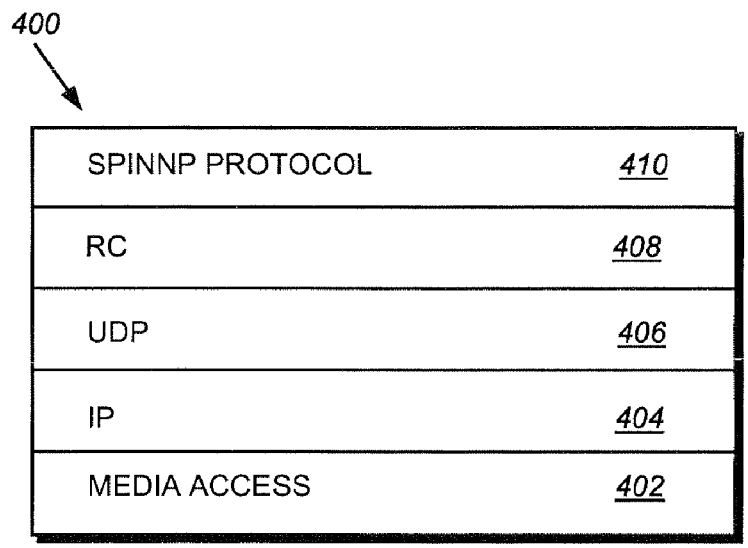
FIG. 4 is a schematic block diagram illustrating the format of a SpinNP message in accordance with an embodiment of with the present invention.

FIG. 4 is a schematic block diagram illustrating the format of a SpinNP message 400 in accordance with an embodiment of with the present invention. The SpinNP message 400 is illustratively used for RPC communication over the switching fabric 150 between remote blades of the cluster 100; however, it should be understood that the term "SpinNP message" may be used generally to refer to IPC and RPC communication between blades of the cluster. The SpinNP message 400 includes a media access layer 402, an IP layer 404, a UDP layer 406, a reliable transport layer, such as a reliable connection (RC) layer 408, and a SpinNP protocol layer 410. As noted, the SpinNP protocol conveys commands related to operations contained within, e.g., client requests to access data containers stored on the cluster 100; the SpinNP protocol layer 410 is that portion of message 400 that carries those commands. Illustratively, the SpinNP protocol is datagram based and, as such, involves transmission of messages or "envelopes" in a reliable manner from a sender (e.g., an N-blade 310) to a receiver (e.g., a D-blade 350). The RC layer 408 implements a reliable transport protocol that is adapted to process such envelopes in accordance with a connectionless protocol, such as UDP 406.

According to the invention, the SpinNP network protocol is a multi-layered protocol that integrates a session infrastructure and an application operation set into a session layer that obviates encapsulation and buffering overhead typically associated with protocol layering. The session layer manages the establishment (creation) and termination of sessions between blades in the cluster and is illustratively built upon a connection layer that defines a set of functionality or services provided by a connection-oriented protocol. The connection-oriented protocol may include a framing protocol layer over a network transport, such as RC and/or TCP, or a memory-based IPC protocol. These connections are formed via the network transport, or via the local memory-to-memory or adapter-to-memory transport, and provide a packet/message transport service with flow control. It should be noted that other connection-oriented protocols, perhaps over other transports, can be used, as long as those transports provide the same minimum guaranteed functionality, e.g., reliable message delivery.

Figure 5:
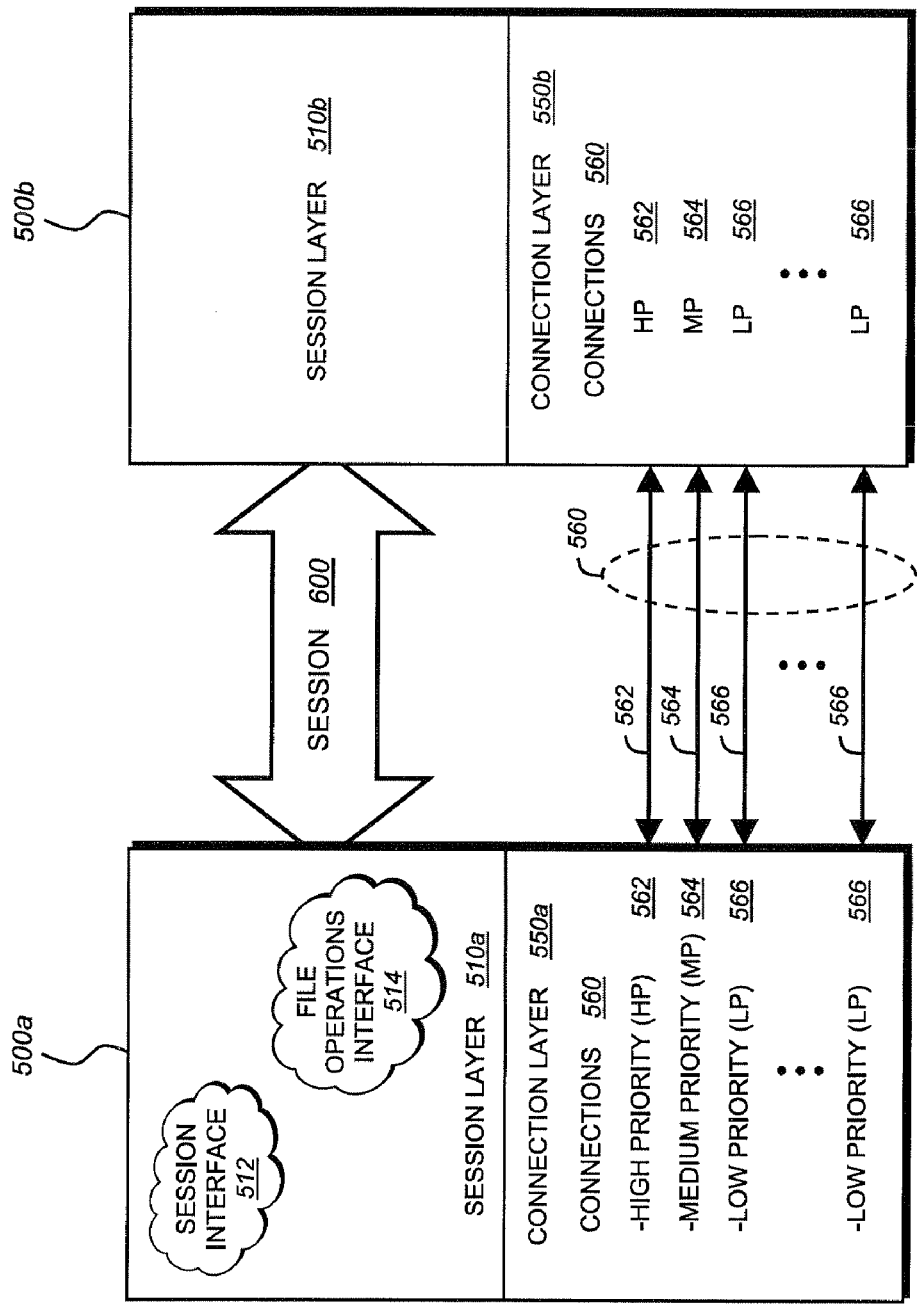
FIG. 5 is a schematic block diagram illustrating the organization of cluster fabric interface modules adapted to implement a SpinNP protocol in accordance with an embodiment of the present invention.

The SpinNP network protocol is illustratively a request/response protocol wherein a blade (requester) receiving a data access request from a client redirects that request to another blade (responder) that services the request and, upon completion, returns a response. The network protocol is illustratively implemented by the CF interface modules 500 and, as such, a SpinNP session provides a context for bi-directional flow of request messages (requests) and bi-directional flow of corresponding response messages (responses) to those requests. Each request consists of one SpinNP message and generates one response, unless the connection is lost or the session terminates abnormally. FIG. 5 is a schematic block diagram illustrating the organization of the CF interface modules 500a,b adapted to implement the SpinNP protocol in accordance with an embodiment of the present invention. Each module 500a,b comprises a SpinNP session layer 510a,b and a connection layer 550a,b.

The SpinNP session layer 510 allows implementation of different operation protocols, hereinafter referred to generally as "operation interfaces". Examples of such interfaces include a session interface 512 that defines a set of protocol operations that is used to provide the session infrastructure and a file operations interface 514 that defines file access operations that are generally translated requests coming from external clients. Other interfaces implemented by the session layer include those used by data management, system management or other "application" subsets of cluster functionality, as needed. Notably, the session infrastructure operations exist in the network protocol at the same level of encapsulation as the application operations to enable an efficient and highly functional implementation. All interfaces share common features of the session layer, including credentials, authentication, verification, sessions, recovery, and response caches. Each operation provided by an interface is illustratively defined by an interface number coupled with a procedure number.

As noted, the SpinNP network protocol 410 relies on connections for reliable message delivery. As such, a session 600 is disposed over one or more connections 560 and is illustratively established between a pair of blades or other participants. For example, a session can be established between D-blades, between an N-blade and a D-blade, and between N-blades (if there proves to be a need for N-blade-to-N-blade SpinNP calls). The session can also be used to inter-connect other entities or agents, including user-space processes and services, to blades or to each other. Each pair of blades typically requires only one session to communicate; however, multiple sessions can be opened simultaneously between the same pair of blades. Each session requires bi-directional request flow over a set of connections that is bound to that session. The session 600 also provides an infrastructure that makes messages secure and supports recovery without requiring an additional protocol layer between the network transport layer (RC or TCP) and the application layer (e.g., file access operations). Each session is independently negotiated and initiated to thereby enable a high level of message concurrency and asynchrony.

The connections 560 are established by the connection layers 510a,b and provide the network transport for the sessions between the blades. At least one connection is required for each session, wherein the connection is used for both requests and responses. Although more than one connection can be bound to a session, only connections that are bound to the session can be used to carry the requests and responses for that session. The connections 560 are bi-directional, allowing message flow in each direction. For example, requests flow in both directions on each session, thereby allowing forward (operational) and reverse (callback) flows to be sent through the same session. Responses for both directions of request flow are also carried in the session. Connections that are bound to sessions cannot be shared by multiple sessions; however, multiple sessions may be multiplexed onto a single connection. That is, operational and callback sessions between an N-blade/D-blade pair can be multiplexed onto a single-connection. Sessions can also multiplex operations for different clients and different users.

Each session 600 is illustratively identified by a globally unique identifier (id) formed of the universal unique ids (UUIDs) of its two participant blades, with the session initiator's UUID listed first. The globally unique id is combined with a 64-bit uniquifier that is unique for all concurrent sessions between the pair of blades, regardless of which blade is the initiator, as well as for any dormant recoverable session for which any state is still stored on either of the two blades. The uniquifier may be generated using the current time, indicating the time of constructing a session initiation operation, i.e., CREATE_SESSION, conveyed within an appropriate request. The resulting session id uniquifier is then confirmed to be unique by the receiver blade. Note that the id uniquifier should be unique unless both blades are trying to create a session to each other simultaneously. If so, each blade can counter-propose a different session id, possibly by simply adding a small random number to the original proposed session id uniquifier.

In the illustrative embodiment, each connection 560 has an assigned priority level and each session 600 is bound to at least three connections, each of which is independently flow-controlled and has a different priority level. Illustratively, the connections include a high priority level connection 562, a medium priority level connection 564 and a low priority connection level 566. The priority level indicates the minimum priority of message that the connection will accept. To that end, each request has one of the three priority levels: high, medium and low. Every response is sent with the same priority as its request. Low priority is used for the vast majority of requests and, as such, each session may include multiple low priority connections 566. Medium priority is used for some callback requests. Callback requests are requests that flow in the reverse of the typical direction, e.g., from server to client. The medium priority callback requests are those requests that are issued to inform the client that it must take some action that will allow the server to free some resources or unblock a different client. Finally, high priority is reserved for requests that the client issues to fulfill the demands of a callback. SpinNP session operations can be performed at any priority.

E. SpinNP Channels

Figure 6:
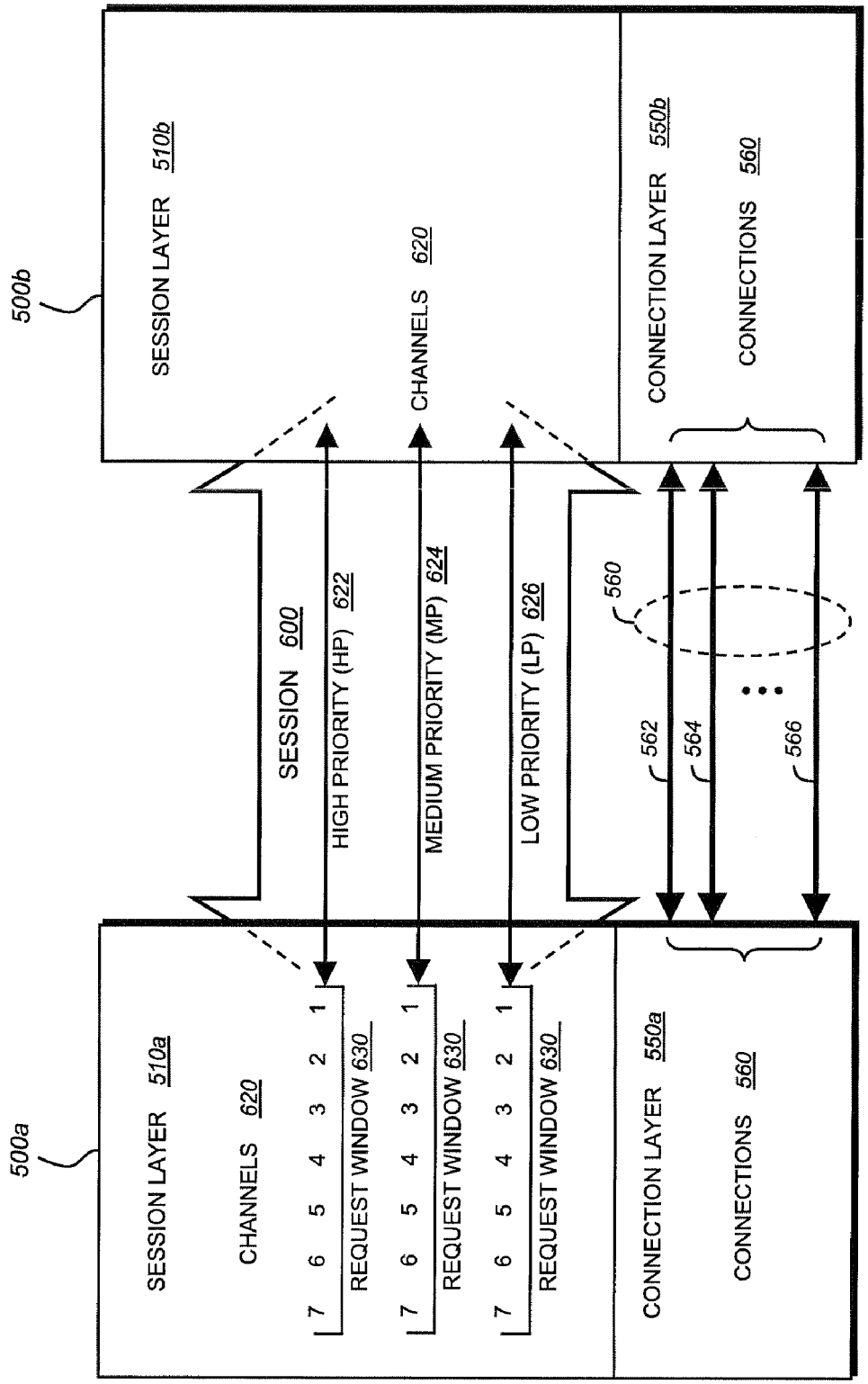
FIG. 6 is a schematic block diagram illustrating channels of a session in accordance with an embodiment the present invention.

Each session comprises a plurality of channels disposed over the connections that, unlike a session, are not bound to the channels. FIG. 6 is a schematic block diagram illustrating channels 620 of a session 600 in accordance with an embodiment of the present invention. A channel 620 is a construct that enables multiple requests to be sent asynchronously over a connection 560. Each channel 620 is illustratively embodied as a request buffer (request window 630) comprising a plurality of "slots" for staging requests sent over the connection, i.e., for storing "outstanding" requests. Within a session, the session layer 510 selects any request window 630 with an available slot to send a request, thereby obviating the possibility of one long-running or lost request (or response) blocking the progress (performance) of the session. Each request window 630 has a predetermined initial sequence window size and the total number of outstanding requests in a session is the sum of the window sizes of all the channels in the session.

Moreover, each channel 620 has an assigned priority level, e.g., high priority channel 622, medium priority channel 624 and low priority channel 626. Although this arrangement imposes a binding between channels and connections of a particular priority level, the requests for any number of channels at that priority level can be sent over any set of connections used to service that priority level. That is, any request from a channel 620 that is staged in a request window 630 can be sent over any connection 560, as long as the priority levels of the request, channel and connection are the same. Although a request is associated with a channel 620 of the session layer 510, this notion disappears at the connection layer 550 (and connections 560).

Notably, there is no mapping between channels and connections; e.g., requests within a channel 620 may be distributed among (sent over) different connections 560 of similar priority, primarily because the session layer 510 performs its own matching of request to response messages within various sessions. This enables the SpinNP session layer 510 to multiplex (i.e., send) requests from channels 620 (request windows 630) of sessions 600 over any connection 560 that is available at the proper priority level. Any messages delivered over a channel can be annotated at the receiver with the priority level, which can speed the processing of higher priority messages through the layers of processing at the receiver. Note that certain numbers of connections are always kept clear of low priority traffic to keep higher priority traffic from being delayed unnecessarily by low priority traffic; however, any connection can, in theory, carry any priority of request.

Each session 600 illustratively contains a limited number of channels 620, defined during session negotiation. Initially, each channel 620 is opened with a sequence window size of one; however, the window size for any channel can be subsequently negotiated via a SET_SEQ_WINDOW_SIZE operation. The total number of outstanding requests in a session is the sum of the window sizes of all the channels in the session. This total is also negotiated at session creation and can be renegotiated at any time. Every time a channel's sequence window is resized, the new window size is counted against the total budget available to the session.

Each channel 620 is identified by a channel number, which is unique within the direction of request flow in the session. In addition, each request has a sequence number that is guaranteed to be unique for that request and that specifies its sequence in the channel. Illustratively, the unique sequence number of each request is one greater than the sequence number of the request that immediately precedes it in the channel. The use of unique sequence numbers for requests prevents re-execution of replayed or duplicated requests, and allows the detection of lost requests in a session. Sequence numbers in each channel wrap-around when the maximum sequence number is reached. The requester is generally required to issue all requests in a channel in strictly increasing order until wrap-around, without skipping any sequence numbers. At wrap-around, the sequence decreases from its maximum value to zero, then resumes its strictly increasing pattern, i.e., $S(n)=n \bmod 2^{64}$, where $S(n)$ is the sequence number of the nth request sent on the channel.

Moreover, each request is identified by a unique identifier ("request id"), which is placed in a request header of the request message. A request id is generally defined as the combination of a channel number and a sequence number. Each response includes the request id of its corresponding request in a response header of the response message. Requests are otherwise distinguished from responses by a protocol tag byte in the message header, so that each message in a session is guaranteed to be unique. Note that the session layer 510 does not depend upon ordering or identifying properties of the connections 560 to resolve the association of a request to a channel 620, or its sequence in that channel.

Windowing is used within each channel 620 to accomplish flow control, bounding the maximum number of outstanding requests per channel, and therefore the total maximum number of outstanding requests per session. Request windowing is defined by the combination of a per request sequence number and a sequence window maintained on the responder. Only requests that fall within the current window of the request channel are accepted for processing by the responder. Any requests outside of the window are failed promptly with an ERR_BADSEQ response. The window of requests initially accepted starts at sequence number 0 and extends to the sequence number equal to that channel's sequence window size w minus 1. The window on the responder is only advanced when the responder sends the response to the oldest outstanding request (the one with the lowest sequence number). The window of sequence numbers that the requester is allowed to send is correspondingly advanced when it receives the response to the oldest outstanding request. The requester can then advance the window by the number of contiguously numbered responses that it has received at the tail of the window in that channel.

In other words, the responder advances the window of requests it will accept in a channel when it sends a response for the oldest outstanding request in the window. At any time, the maximum sequence number that can be accepted in a channel equals the lowest sequence number of any request that has not been responded to, plus w−1. The requester can send a request with sequence number $(n+w) \bmod 2^{64}$ when it receives the response for the request with sequence number n. Note that the sequence window affects the size of a response cache, if such a cache is kept. Response cache entries are pre-served in the response cache until the responder receives confirmation that a response has is been received. This confirmation is received implicitly for the request with sequence number n when the request with sequence number n+w is received, where w is the window size.

Connections 560 can also be unbound from a session 600, which is generally performed during the process of closing a connection. Unbinding a connection from a session ensures that the connection is flushed of all outstanding requests and responses. All but one connection can be unbound from a session at a time without destroying the session to which it is bound. Unbinding the connection from a session does not cause the termination of the session. An abandoned session will eventually time itself out and terminate. However, a session that is reconnected before the timeout period expires does not lose its session state or identity. A connection can buffer and queue requests and responses, but it is expected to deliver complete messages to a SpinNP target as quickly as possible.

Specifically, a session 600 is closed by a CLOSE_SESSION operation, which also unbinds the last connection in the session. Individual connections can be disassociated from a session by an UNBIND_CONNECTION operation. Session termination unbinds all connections in the session. Safe termination of a session requires that all requests in the connections are delivered, and all the matching responses are received before the connections are unbound. Immediate termination of a session unbinds the connections without guaranteeing delivery of outstanding requests or responses. The CLOSE_SESSION operation takes an enumerator argument to specify the manner in which connections are unbound in the session. Immediate session termination should only be used in the event of a failure where rapid recovery is needed, or in the event of an immediate need to remove a node from the cluster.

F. Version Negotiation

The present invention is directed to a system and method for efficiently performing version negotiation of a network protocol, such as the SpinNP network protocol, executing on nodes of a cluster. The SpinNP network protocol is a versioned protocol embodied as a version number encoded in headers of SpinNP messages 400, such as requests and responses, during session creation. As described herein, session version negotiation occurs during session creation and, as such, is accomplished using a single request/response "create session" exchange. Notably, session version negotiation is effected using contents of protocol tag and version fields of headers associated with request and response messages exchanged between the nodes.

Figure 7A:
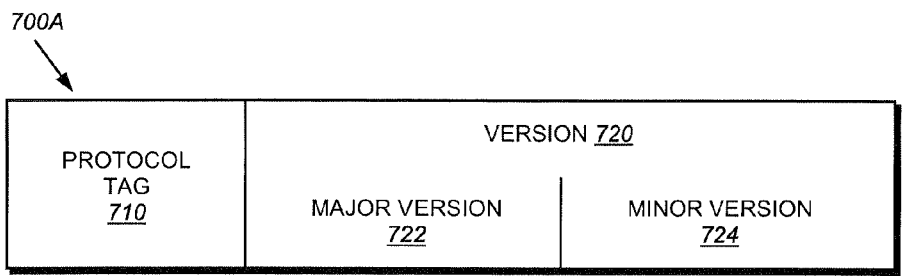
FIG. 7 is a schematic block diagram illustrating the format of a header of the SpinNP message in accordance with an embodiment of the present invention.

FIG. 7A is a schematic block diagram illustrating the format of a header 700A of a SpinNP message 400 for negotiating the SpinNP version in accordance with an embodiment the present invention. The header 700 comprises, inter alia, a protocol tag field 710 and a version field 720. The protocol tag field 710 contains values or tags that define the context in which the request and response messages are used during the create session exchange. The version field 720 contains a proposed version of the session protocol for use by the nodes in the session. The version field 720 includes a major version subfield 722 configured to store a major version number and a minor version subfield 724 configured to store a minor version number.

The session protocol version defines the structure and meaning of fields in the message header. It also defines the structure and meaning of a set of operation payloads carried in requests and responses to those requests. The set of operations is called the session operations, and as a whole, forms the session interface. Other sets of operations may also be defined, each forming a different interface. The invention allows the version of each of these interfaces, and the format and meaning of the corresponding operation sets' request and response messages, to be negotiated independently of the session version negotiated at session creation. This is possible even though the session operations and the additional operations that are defined by other interfaces occupy the same portion of the overall request and response message structure.

In the illustrative embodiment, the version of the SpinNP network protocol is defined by major and minor version numbers. Major version number changes require an upgrade at both nodes (blades) before they use the new version, although the network protocol ensures that blades configured to support different major versions can agree on a common major version to use for communication during system upgrades. The major version number may be changed in all cases where a minor version number change is acceptable. A new major version may contain new operations or changes in the interpretation of existing message fields. Negotiation of the protocol version to be used at the start of a session results in selection of the highest common supported version number between the two blades, where the highest version is the one with, first, the highest major version number, and second, the highest minor version number in that major version. These rules apply both to SpinNP protocol version numbers (i.e., "protocol versioning") and to interface version numbers (i.e., "interface versioning"). The present invention enables the independent version negotiation of both the protocol and of each interface associated with the protocol.

SpinNP protocol versioning negotiation occurs during session creation, illustratively using the create session operation request, CREATE_SESSION. An example of session creation is described in the above incorporated U.S. patent application entitled, SYSTEM AND METHOD FOR MULTIPLEXING CHANNELS OVER MULTIPLE CONNECTIONS IN A STORAGE SYSTEM CLUSTER. As noted, version negotiation is accomplished using a single create session request/response exchange, which also establishes the session. The negotiated version of the network protocol is illustratively a property of a session and, as such, applies to all session operations, as well as to the message headers 700A and overall construction of the SpinNP messages 400. That is, the negotiated SpinNP version number specifies (i) the content and format of request/response message headers and (ii) the version of the SpinNP protocol used by the participants.

According to an aspect of the invention, initial session level version negotiation is carried out completely in accordance with a predetermined portion, e.g., the first four bytes, of the request and response message headers 700A. The first byte of any message 400 is the protocol tag byte stored in the protocol tag field 710 of the header 700A. Values of protocol tag bytes include PROTOCOL_REQ_TAG, PROTOCOL_RESP_TAG, PROTOCOL_INIT_TAG, and PROTOCOL_INIT_RESP_TAG. The tags are generally referred to by shorthand and illustratively have ASCII values 'S', 'P', 'I', and 'N', respectively, as shown in Table 1. Illustratively, the INIT and INIT_RESP values are used for request and response messages during session creation, while REQ and RESP values are used for request and response messages, respectively, after session establishment.

TABLE 1

| Definition | Shorthand | Tag Byte |
|---|---|---|
| PROTOCOL_REQ_TAG | REQ | "S" |
| PROTOCOL_RESP_TAG | RESP | "P" |
| PROTOCOL_INIT_TAG | INIT | "I" |
| PROTOCOL_INIT_RESP_TAG | INIT_RESP | "N" |

Broadly stated, the nodes send proposed session version numbers, tagged with INIT or INIT_RESP values, in the headers of their respective messages during the create session exchange. Once a node identifies a proposed version of the protocol that it can use ("speak"), the node starts sending messages having headers tagged with REQ or RESP values and without version numbers. Version number negotiation starts high, e.g., with the highest version number that the session initiator speaks, and proceeds down-wards to thereby guarantee that the negotiation results in the selection of the highest mutually-spoken version. Once a protocol version is selected for a session, all further messages in that session use the same protocol version.

The first request sent over a connection to create a session is an initial CREATE_SESSION request containing a proposed version number. The initial CREATE_SESSION request always contains protocol tag INIT. That is, no request other than CREATE_SESSION can use the tag INIT. The initial CREATE_SESSION request is sent with request id {0,0} denoting that it is the first request sent on channel 0. Subsequent CREATE_SESSION requests are sent with successive sequence numbers, but only channel zero is open for communication until the session is established and a greater number of channels is negotiated.

The requester cannot send another request in the session until it receives a response to the CREATE_SESSION request. The proposed version number contained in the request is the highest version "spoken" by the requester. Therefore, it is not possible for the responder to negotiate a higher protocol version than that initially requested. If it accepts the proposed version number, the responder returns a CREATE_SESSION response with the protocol tag RESP. The requester only interprets the remainder of the response fields if the response is tagged with RESP.

If, upon receipt of the initial CREATE_SESSION request, the responder rejects the proposed version number, it responds with a different proposed version number and the protocol tag INIT_RESP in a response. Note that the response fields other than the version number in responses tagged with INIT_RESP are ignored. After rejecting the version number, the responder takes no other action to create the session and merely waits to receive another CREATE_SESSION request. If the different proposed version number is acceptable, the requester tags its next request with REQ, and sends the request to the responder. Otherwise, the requester sends the CREATE_SESSION request with yet another proposed version number, tagged with INIT.

Once a session is established, its protocol version is not modifiable or renegotiable. A participant, e.g., an element/blade of a node, can renegotiate the protocol version used ("spoken"), but it must create a new session to do so. Once a session is established and the version number has been negotiated, the version number is no longer sent with each message. However, the protocol tag byte, either REQ or RESP, is still included as the first byte of each message. The first byte of every request is the protocol tag REQ and the first byte of every response is the protocol tag RESP. Each participant can match incoming requests and responses to these tags. Note that the version number is available from a session context in each participant in the session. A special operation, GET_SESSION_INFO, is available to retrieve session context data from the participant in the session.

Figure 8:
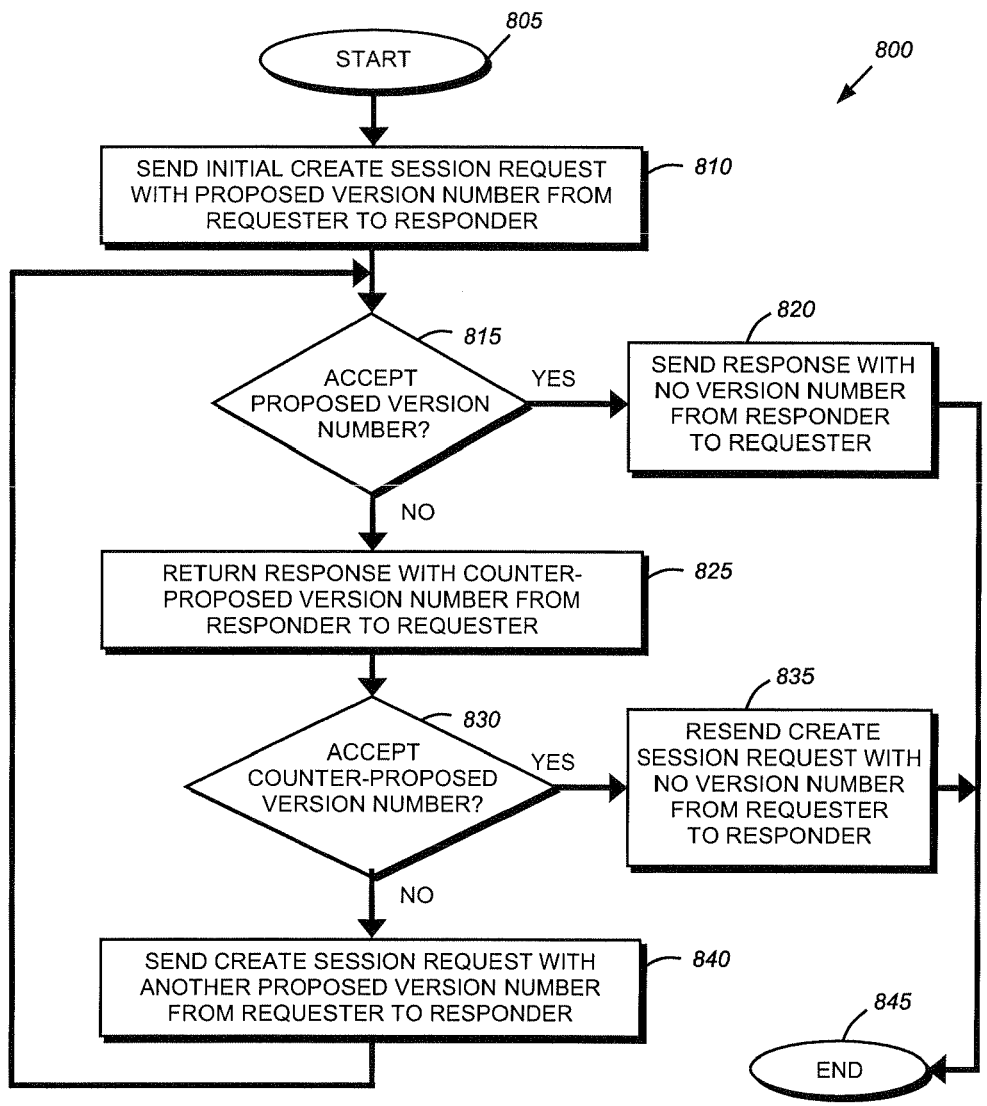
FIG. 8 is a flowchart illustrating a procedure for implementing version negotiation in accordance with the present invention.

FIG. 8 is a flowchart illustrating a procedure 800 for implementing version negotiation in accordance with the present invention. The procedure starts at step 805 and proceeds to step 810 where a session creator (e.g., a requester) sends an initial create session request, CREATE_SESSION, with protocol tag INIT and a proposed version number it would like to speak over a channel of a session to a responder. In step 815, the responder determines whether it can accept the proposed version number. If so, the responder responds with a CREATE_SESSION response with protocol tag byte RESP and with no version number in the header of the response (in step 820). The procedure then ends at step 845.

However, if the responder does not accept the version number requested, it returns a response message with protocol tag byte INIT_RESP and its own counter-proposal for version number in step 825. In step 830, the requester determines whether it can accept the counter-proposed version number. If so, the requester resends the CREATE_SESSION request with no version number field, but with tag byte REQ (step 835) and the procedure ends at step 845. Otherwise, in step 840, the requester sends the CREATE_SESSION request with yet another proposed version number and protocol tag INIT, and the procedure returns to step 815.

The NEGOTIATE_SESSION operation is used after session creation to negotiate upwards from the initial minimal resources allocated to a SpinNP session. This operation can also be used in an existing session to renegotiate session parameters, such as the number of channels or the maximum number of outstanding requests across all channels in the session. The negotiation is generally used to request new higher limits on resources for the session, but may also be used to ramp down the resources used by the session. In this latter case, the responder refuses to accept requests on closed channels, returning ERR_BAD_CHANNEL.

According to another aspect of the invention, interface versioning is independent of the overall SpinNP protocol versioning. Therefore, it is possible that one operation interface could stabilize and retain the same version number over a number of SpinNP major and minor versions. Similarly, another interface could change rapidly, requiring many version number changes, without affecting either the SpinNP version number or the versioning of other interfaces that share SpinNP as a session layer. Once the SpinNP protocol version has been negotiated, the negotiated version defines the format of the NEGOTIATE_INTERFACE operation that is utilized to negotiate individual interface versions (i.e., interface version negotiation). Each interface specification includes a definition of the minimum SpinNP version that is compatible with that version of the interface.

Specifically, each SpinNP operation interface is independently versioned, and has its own major and minor version numbers. An interface is a set of related operations that are associated with a single version number. For example, the file operations interface bundles all operations that are file operations so that once a negotiated version for the file operations interface is selected, the formats of the file operations is thereby defined. Note that version negotiation for the session interface 512 is performed at session initialization and that the session interface is always available once a session is established. The use of other interfaces in the session is negotiated in accordance with a NEGOTIATE_INTERFACE operation during session creation. That is, the NEGOTIATE_INTERFACE operation enables other interfaces, such as file operations interface 514 and data management operations interface, to be used during the session, while also enabling negotiation of the version of the interface to use in the session. This aspect of the invention is notable in that it allows separately-versioned session layer interface protocols over a single underlying set of session layer operations.

The request containing the NEGOTIATE_INTERFACE operation illustratively includes an interface and version number that the requester proposes to use for each interface. In the event that the responder does not accept the proposed interface/version, it returns a response containing an error code along with an array of acceptable interfaces. The response interfaces must be different acceptable version numbers of the requested interface. As with the SpinNP version number, the responder does not attempt to negotiate "up" from the requested interface version, even if it supports a higher version of the interface. It is incumbent upon the requester to request the highest version of the interface it can speak. Since this entire negotiation takes place using the already negotiated session interface version, there is no reason for confusion or mis-interpretation of the specific interfaces and versions of those interfaces being negotiated. Either side of a session may initiate interface version negotiation once the session has been opened. Illustratively, interfaces are only "opened" (i.e., their operation sets made available for use) in the direction of the NEGOTIATE_INTERFACE request used to open them. In alternate embodiments, interfaces may be opened bi-directionally.

Figure 7B:
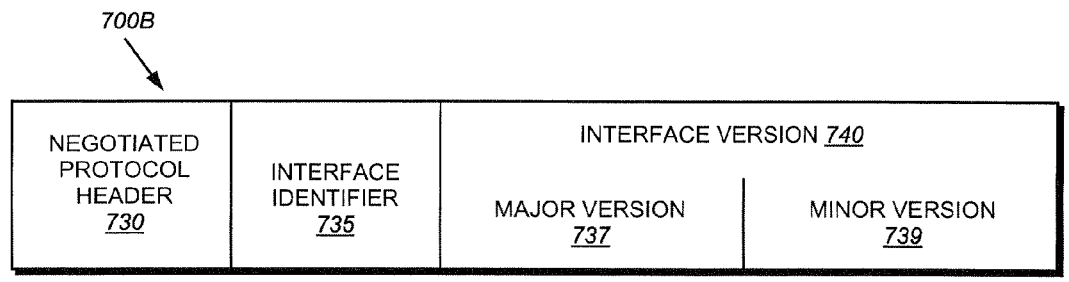

FIG. 7B is a schematic block diagram illustrating the format of a header 700B of a SpinNP message 400 for negotiating an interface version in accordance with an embodiment the present invention. The header 700B comprises, inter alia, a negotiated protocol header 730, an interface identifier field 735 and an interface version field 740. The negotiated protocol header 730 comprises a protocol header that is determined by the version of the SpinNP protocol that was previous negotiated. The interface identifier field 735 identifies the interface, e.g., file operations, that is to be negotiated. The interface version field 740 contains a proposed version of the interface for use by the nodes in the session. The interface version field 740 includes a major version subfield 737 configured to store a major version number and a minor version subfield 739 configured to store a minor version number.

Figure 9:
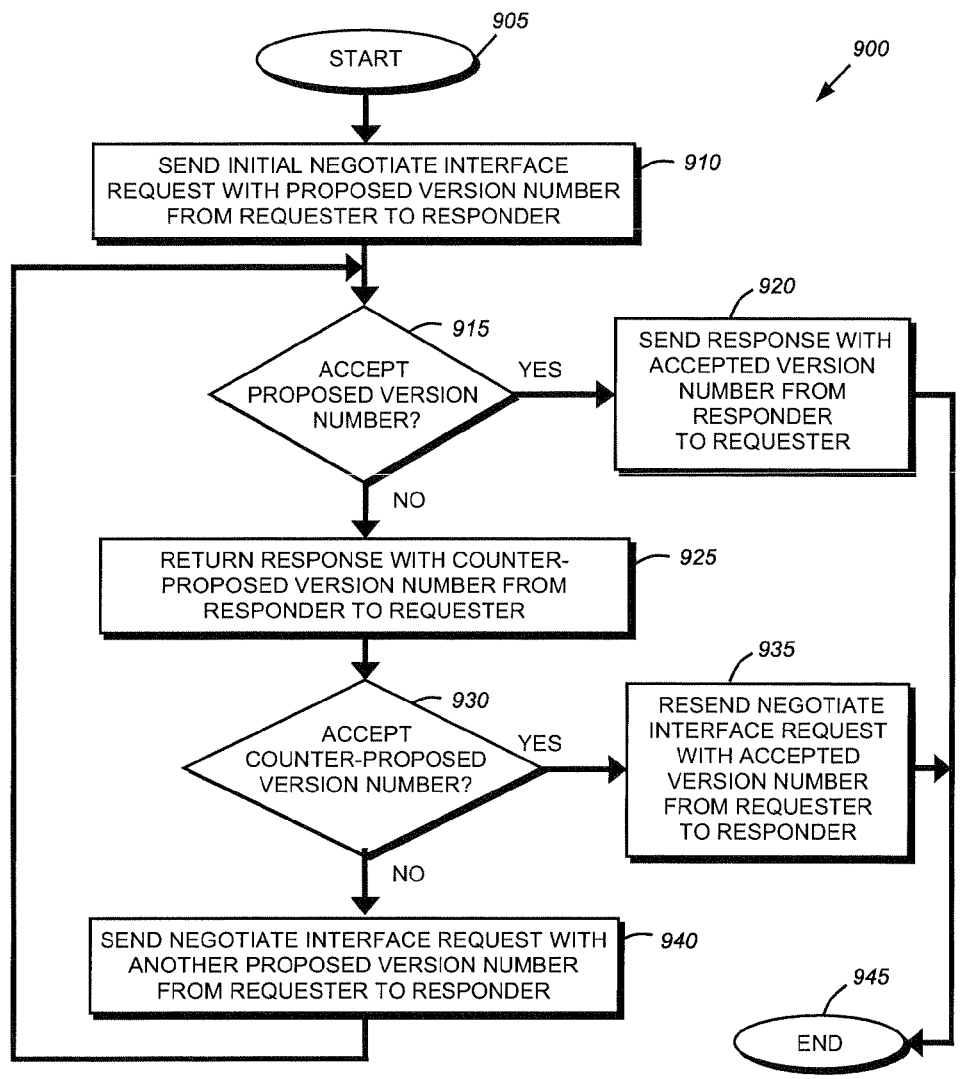
FIG. 9. is a flowchart illustrating a procedure for implementing version negotiation in accordance with the present invention.

FIG. 9 is a flowchart illustrating a procedure 900 for implementing version negotiation in accordance with the present invention. The procedure starts at step 905 and proceeds to step 910 where a requester sends an initial NEGOTIATE_INTERFACE message identifying one or more interfaces and the proposed version major and minor numbers of each interface that it would like to utilize. In step 915, the responder determines whether it can accept the proposed version number. If so, the responder responds with a NEGOTIATE INTERFACE response with the accepted interface number and the accepted major and minor version numbers of each accepted interface in the body of the response (in step 920). The procedure then ends at step 945.

However, if the responder does not accept one or more of the interface version numbers requested, it returns a response message with its own counter-proposal for version numbers in step 925. In step 930, the requester determines whether it can accept the counter-proposed version number. If so, the requester resends the NEGOTIATE_INTERFACE request with the accepted version numbers for each accepted interface. The procedure ends when a request response exchange is completed with the same set of interfaces and the same major and minor version numbers for each interface, at step 945. Otherwise, in step 940, the requester sends the NEGOTIATE_INTERFACE request with yet another set of proposed interfaces and versions and the procedure returns to step 915.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades or elements, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes, layers and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for efficiently performing version negotiation of a network protocol, the method comprising:

transmitting, by a first node of a pair of nodes, a highest protocol version number of the first node to a second node of the pair of nodes;

receiving, by the second node, the highest protocol version number of the first node;

transmitting, by the second node to the first node, a highest acceptable protocol version number of the second node that is less than the highest protocol version number of the first node;

negotiating a version of the network protocol using a create session exchange between the nodes; and creating a session between the first node and the second node using the highest acceptable protocol version number of the second node.

2. The method of claim 1 further comprising:

negotiating a version of the network protocol using contents of protocol tag and version fields of headers associated with request and response messages exchanged between the nodes.

3. The method of claim 1 further comprising:

sending proposed version numbers in version fields of readers of messages;

identifying a proposed version number that a node can use; and sending messages having headers without version numbers.

4. The method of claim 1 further comprising:

negotiating, after session creation, a version of one or more interfaces using a negotiate interface exchange.

5. A system configured to efficiently perform version negotiation of a network protocol, the system comprising:

a plurality of nodes;

a highest network protocol version number of a first node of the plurality of nodes;

a highest network protocol version number of a second node of the plurality of nodes, the highest network protocol version number less than the highest network protocol version number of the first node; and a session layer of each node configured to create a session between the first node and the second node, the session layer configured to negotiate a highest network protocol version number common to both the first and second node with a create session exchange by using contents of protocol tag and version fields of headers associated with request and response messages exchanged between the nodes.

6. The system of claim 5 further comprising:

a proposed version number of the network protocol for use by the nodes in the session.

7. The system of claim 5 further comprising:

a create session exchange for version negotiation, the exchange starts with a highest version number and proceeds downwards to thereby guarantee that the negotiation results in selection of a highest version used by the nodes.

8. The system of claim 5 further comprising:

a protocol tag field that contains values, the values define a context in which request and response messages are used during the create session exchange.

9. The system of claim 5 further comprising:

an INIT values for a request messages, the request message for session creation; and an INIT_RESP value for a response message, the response message for session creation.

10. The system of claim 5 further comprising:

a REQ values for a request messages, the request in an established session; and a RESP value for a response message, the response in an established session.

11. The system of claim 5 further comprising:
a version of one or more interfaces associated with the network protocol, the session layer configured to negotiate the version.

12. A method for efficiently performing version negotiation of a network protocol, the method comprising:
transmitting, by a first node of a pair of nodes, a highest protocol version number of the first node to a second node of the pair of nodes;
receiving, by the second node, the highest protocol version number of the first node transmitting, by the second node to the first node, a highest acceptable protocol version number of the second node that is less than the highest protocol version number of the first node;
creating a session between session layers of the first node and the second node;
performing protocol versioning negotiation of session layer operations; and
performing interface versioning negotiation of additional interface protocols independent of performing session protocol versioning to thereby allow separately-versioned interface protocols in addition to an underlying set of session layer operations.

13. Apparatus configured to efficiently perform version negotiation of a network protocol, the apparatus comprising:
means for transmitting, by a first node of a pair of nodes, a highest protocol version number of the first node to a second node of the pair of nodes;
means for receiving, by the second node, the highest protocol version number of the first node;
means for transmitting, by the second node to the first node, a highest acceptable protocol version number of the second node that is less than the highest protocol version number of the first node;
means for negotiating a version of the network protocol using a create session exchange between the nodes; and
means for creating a session between the first node and the second node using the highest acceptable protocol version number of the second node.

14. The apparatus of claim 13 further comprising:
means for negotiating a version of the network protocol using contents of protocol tag and version fields of headers associated with request and response messages exchanged between the nodes.

15. The apparatus of claim 13 further comprising:
means for sending proposed version numbers in version fields of headers of messages;
means for identifying a proposed version number that a node can use; and
means for sending messages having headers without version numbers.

16. A computer readable medium containing executable program instructions when executed by a computer for efficiently performing version negotiation of a network protocol, the executable instructions comprising one or more program instructions for:
transmitting, by a first node of a pair of nodes, a highest protocol version number of the first node to a second node of the pair of nodes;
receiving, by the second node, the highest protocol version number of the first node;
transmitting, by the second node to the first node, a highest acceptable protocol version number of the second node that is less than the highest protocol version number of the first node;
negotiating a version of the network protocol using a create session exchange between the nodes; and
creating a session between the first node and the second node using the highest acceptable protocol version number of the second node.

17. The computer readable medium of claim 16 further comprising:
one or more program instructions for negotiating a version of the network protocol using contents of protocol tag and version fields of headers associated with request and response messages exchanged between the nodes.

18. The computer readable medium of claim 16 further comprising one or more program instructions for:
sending proposed version numbers in version fields of headers of messages;
identifying a proposed version number that a node can use; and
sending messages having headers without version numbers.

19. A method comprising:
transmitting, by a first node of a pair of nodes, a highest protocol version number of the first node to a second node of the pair of nodes;
receiving, by the second node, the highest protocol version number of the first node;
transmitting, by the second node to the first node, a highest acceptable protocol version number of the second node, the highest acceptable protocol version number of the second node less than the highest protocol version number of the first node;
receiving, by the first node, the highest acceptable protocol version of the second node;
transmitting, by the first node to the second node, a highest acceptable protocol version number of the first node, the highest acceptable protocol version number of the first node less than the highest acceptable protocol version number of the second node; and
creating a session between the first node and the second node using the highest acceptable protocol version number of the of the first node.

20. The method of claim 19 further comprising:
transmitting, by the second node to the first node, a next highest acceptable protocol version number of the second node, the next highest acceptable protocol version of the second node less than the highest acceptable protocol version of the first node; and
creating a session between the first node and the second node using the next highest acceptable protocol version of the second node.

21. The method of claim 19 further comprising:
receiving, at the second node, the highest protocol version number of the first node;
transmitting, by the second node to the first node, a highest protocol version number of the second node, the highest protocol version number of the second node comprising a highest acceptable major protocol version number not greater than the highest major protocol version number of the first node and a highest acceptable minor protocol version number less than the highest minor protocol version number of the first node;
receiving, at the first node, the highest protocol version number of the second node;
creating a session between the first node and the second node using the highest acceptable minor protocol version number of the of the second node; and
upgrading the highest protocol version number of the first and second node to the greater of the highest major protocol version number of the first node and the highest acceptable major protocol version number of the second node.

22. A method comprising:
(a) transmitting, by a first node of a pair of nodes, a highest protocol version number of the first node to a second node of the pair of nodes;
(b) receiving, by the second node, the highest protocol version number of the first node;
(c) transmitting, by the second node to the first node, a highest acceptable protocol version number of the second node, the highest acceptable protocol version number of the second node less than the highest protocol version number of the first node;
(d) receiving, by the first node, the highest acceptable protocol version number of the second node;
(e) transmitting, by the first node to the second node, a next highest acceptable protocol version number of the first node, the next highest acceptable protocol version number of the first node less than the most recent acceptable protocol version number transmitted by the second node;
(f) receiving, by the second node, the next highest acceptable protocol version number of the first node;
(g) transmitting, by the second node to the first node, a next highest acceptable protocol version number of the second node, the next highest acceptable protocol version number less than the most recent acceptable protocol version number transmitted by the first node;
(h) receiving, by the first node, the next highest acceptable protocol version number of the second node;
repeating (e) through (h) until a highest acceptable protocol version number common to the first and second node is determined; and
in response to determining the highest acceptable protocol version number common to the first and second node, creating a session between the first node and the second node using the highest acceptable protocol version number common the first and second node.

23. A method:
transmitting, by a node, a highest protocol version number of the node;
receiving, by the node, a proposed protocol version number, the proposed protocol version number less than the highest protocol version number of the node;
determining if the proposed protocol version number is acceptable to the node; and
in response to determining that the proposed protocol version number is acceptable to the node, accepting the proposed protocol version number for a communication session.

24. The method of claim 23 further comprising:
transmitting, by the node, a highest acceptable protocol version number of the node less than the proposed protocol version number.

25. A method comprising:
sending a first message from a first node to a second node, a header of the first message containing a first proposed protocol version number, the first proposed protocol version number a highest protocol version number of the first node;
sending a second message to the first node from the second node, a header of the second message containing a second proposed protocol version number, the second proposed protocol version number less than the first proposed protocol version number;
determining if the second proposed protocol version number is acceptable by the first node; and
in response to determining that the second proposed protocol version number is acceptable by the first node, sending a message from the first node to the second node, the message with a header, the header of the message without a protocol version number.

26. The method of claim 25 further comprising:
sending a third message from the first node to the second node, a header of the third message containing a third proposed protocol version number, the third proposed protocol version number less than the second proposed protocol version number;
determining if the third proposed protocol version number is acceptable by the second node; and
in response to determining that the third proposed protocol version number is acceptable by the second node, sending a message from the second node to the first node, the message with a header, the header of the message without a protocol version number.

27. A system comprising:
a first node;
a second node;
one or more messages, the one or more messages configured to exchange information between the first and second nodes;
headers of the one or more messages, the headers comprising proposed protocol version numbers for establishing a session between the first and second nodes; and
a highest protocol version number common to both the first node and the second node, the highest protocol version number common to both the first and second node determined by the proposed protocol version numbers in the headers of the one or more messages.

* * * * *

UNITED STATES PATENT AND TRADEMARK OFFICE
CERTIFICATE OF CORRECTION

PATENT NO. : 7,466,659 B1  Page 1 of 1
APPLICATION NO. : 11/119119
DATED : December 16, 2008
INVENTOR(S) : Michael L. Kazar It is certified that error appears in the above-identified patent and that said Letters Patent is hereby corrected as shown below:

Col. 7, Line 49, please amend as shown:
 location of data container content in the SVS volume to thereby Col. 12, Line 11, please amend as shown:
 single[[-]] connection. Sessions can also multiplex operations for Col. 13, Line 64, please amend as shown:
 ("request id"), which [[is]] is placed in a request header of the Col. 14, Line 39, please amend as shown:
 pre[[-]]served in the response cache until the responder receives Col. 14, Line 40, please amend as shown:
 confirmation that a response has [[is]] been received Col. 16, Line 52, please amend as shown:
 session initiator speaks, and proceeds down[[-]]wards to thereby Col. 20, Line 17, please amend as shown:
 readers headers of messages Col. 20, Line 58, please amend as shown:
 an INIT value[[s]] for a request message[[s]], the request message Col. 20, Line 63, please amend as shown:
 a REQ value[[s]] for a request message[[s]], the request in an Signed and Sealed this Twenty-fifth Day of May, 2010

David J. Kappos
*Director of the United States Patent and Trademark Office*